United States Patent
Middeljans et al.

(10) Patent No.: US 7,103,557 B2
(45) Date of Patent: Sep. 5, 2006

(54) INTERNET PAYMENT PROCESS BASED ON RETURN TRAFFIC

(75) Inventors: Jakobus Middeljans, Eindhoven (NL); Warner Rudolph Theophile Ten Kate, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 749 days.

(21) Appl. No.: 10/028,122

(22) Filed: Dec. 21, 2001

(65) Prior Publication Data

US 2002/0091544 A1 Jul. 11, 2002

(30) Foreign Application Priority Data

Dec. 22, 2000 (EP) .................................. 00204805

(51) Int. Cl.
*G06F 17/60* (2006.01)
(52) U.S. Cl. .................. 705/1; 705/52; 705/53; 705/54; 709/217; 380/231
(58) Field of Classification Search .................. 705/1, 705/80, 52–54, 32; 709/217; 713/201; 380/231; 725/5
See application file for complete search history.

(56) References Cited

U.S. PATENT DOCUMENTS 5,940,504 A * 8/1999 Griswold .................. 705/59
6,069,957 A * 5/2000 Richards .................. 380/281
6,236,971 B1 * 5/2001 Stefik et al. .................. 705/1
6,237,786 B1 * 5/2001 Ginter et al. .................. 213/153
6,389,541 B1 * 5/2002 Patterson .................. 713/201
6,427,140 B1 * 7/2002 Ginter et al. .................. 705/80

FOREIGN PATENT DOCUMENTS

EP 0715247 A1 11/1995
EP 715243 A1 * 6/1996

OTHER PUBLICATIONS

Okerson, Ann; "Who Owns Digital Works?", Jul. 1996, Scientific American, vol. 275, Issue 1.*

* cited by examiner

*Primary Examiner*—John W. Hayes
*Assistant Examiner*—Freda Nelson

(57) ABSTRACT

The invention relates to an internet payment system based on return traffic. In regard of payment for content delivered across the internet an aspect of the invention provides for initiation of an explicit return flow of packets. Reception by the server of these return packets entails reception of payment tokens of the client by the server and a sign to the server to continue with the delivery of the content.

Maskerading by the client can be prevented by sending challenges along with the data packets and by having the client to send responses to the same along with the return packets.

9 Claims, 3 Drawing Sheets

INTERNET PAYMENT PROCESS BASED ON RETURN TRAFFIC

The present invention relates to a process and a system for controlling the delivery of digital works across a communications channel such as the internet in cases in which payment is required for the content of said digital works as received by a client. In particular, it relates to a transmission protocol comprised in said system suitable for said process.

Internet traffic is characterized in that it is a Best Effort type of service. This means that data packets sent across the internet have a probability of being lost or being delayed while en route. Measures to solve this are generally referred to in terms of Quality of Service, or QoS. A system of the above-mentioned type is known from document EP-0715247. This document provides a comprehensive description of rendering systems, structures of digital works, attachment of user rights to a digital work, repositories, credit servers, user rights language and repository transactions which said system can comprise.

The transmission protocol disclosed in said document is directed to preclude certain failure modes, such as malicious or accidental interferences on the communications channel. Its stated object is that there should be no time at which a party to the communications can break a connection as a means to avoid payment after using a digital work. A complete digital work needs to be delivered before payment for the same is effectuated. In other words, the transactions with delivery are atomic by nature.

In regard of the operation, said document discloses that if there are several blocks to be sent, the server waits until receiving an acknowledgement message from the requester (client). When an acknowledgement message is received the server sends the next block to the requester and again waits for acknowledgement. Transmission thus occurs in a block-by-block mode of operation. The requester (client) also repeats the same cycle of states.

If there are no more blocks to send, the server commits to the transaction and waits for the final acknowledgement message. If there is a communications failure before the server receives the final communications message, it still commits to the transaction but includes a report about the event to its credit server. This report serves two purposes, one of which is to help legitimize any claims by a user of having been billed for receiving digital works that were not completely received. There is a similar protocol on the requester (client) side; the key property being that both the server and the requester cancel a transmission if it is interrupted before all of the data blocks are delivered and commit to it if all of the data blocks have been delivered.

The atomic nature of such transactions with delivery poses several problems when the digital works concerned are large or when content has to be streamed during a long period of time. Such a situation arises in regard of payment for e.g. audio and/or visual or other multimedia material first after completion of reception of the whole contents thereof. A requester (customer) may not view (i.e. receive) the whole digital work before having settled payment for the same. One problem relates to the probability of disruption of communication which is greater in proportion to the size of, and thus to the time needed for transferring, the digital work. Another problem relates to the need for a report to the credit server, both from the server as well as the requester, in regard of legitimizing payment for the digital work. Yet another problem relates to the server not being able to delete any transferred digital work until receiving the final acknowledgement from the requester, but also being unable to use the file in regard of prevention of loss of data. This requires a comprehensive protocol comprising e.g. two-commit phase or a level of encryption without any real gain in accountability.

There is yet another problem related to the atomic nature of said transactions. This problem concerns the real-time processing requirement. Since delivery of continuous media requires real-time handling (if delivery thereof isn't a download operation), the atomic payments need to proceed at the speed of delivery, e.g. at 20 ms per packet, such that processes or functions in regard of the same do not lead to discontinuities ('hiccups' or hitches) in the media presentation.

It is an object of the present invention to simplify the transmission protocol for said processes and systems suitable for said processes.

It is another object of the invention to provide for a transmission protocol which is executable on a server computer and a client computer (so-called end-hosts; thus for end-user operations).

It is yet another object of the present invention to provide for a transmission protocol which entails payment for all received digital packets even in the case of discontinued transmission of the digital work.

According to one aspect of the invention one or more of the stated objects is or are achieved by a process for controlling delivery of digital works across a communication channel such as the internet.

The basic novel and inventive concept is to have the stream of acknowledgement codes (ACK) which are known from available transmission protocols also serve the function of payment tokens. Central to this concept is the linking or association of payment to a streaming delivery, i.e. to a regular flow of packets lasting for some period of time. Payment advances along with the progress of that time period; delivery of content discontinues upon non-advancement of acknowledgement of receipt, thus upon non-advancement of payment for the content.

The related technical advantage is that it makes use of an existing and clear audit trail that the client has received a digital work (or a part thereof), as substantiated and embodied by the successive stream of acknowledgement codes, to regulate payment for the content of the packets received. A further technical advantage is that by linking payment for content to this already available successive stream of acknowledgement codes, regulation of payment for the content delivered is simplified. As a result, the need for adding layers to the transmission protocol in regard of payment tokens, commitment or encryption is eliminated. A less strict transmission protocol or integrity mechanism therefore suffices. A client simply pays for each packet that he himself has already acknowledged as having received in good order. And a client pays as he receives. This results in a less redundant, thus faster execution of payment transactions. It thus offers a greater efficiency to both the server and the client.

It will be noted that the term transmission or transport protocol also encompasses streaming protocols. Streaming is not limited to transmission or transport protocols; at least server and client application processes also play a role in this regard.

According to a further aspect of the invention one or more of the stated objects is or are achieved by making use of a credit window during transmission of digital packets by the server as specified in claim 3. This follows from overcoming the prejudice that in regard of payment of content of digital work, transmission of the whole digital work has to be completed before being able to definitely settle payment for the same. The related technical advantage is that the server allows for an amount of credit which is very small compared to the size of the whole digital work. This entails that the server (or content provider) will not suffer any great loss in case of non-payment for the packets sent in credit if no further acknowledgement codes were to be received from the client (requester). The size of the credit window is adaptable to the actual transmission conditions and the policy of the transaction.

The concept of a window as such is known for the use of controlling the flow rate of the transmission. See for example D. P. Bertsekas and R. G. Gallager, "Data Networks", Prentice-Hall, Inc., NJ, USA, 1992, chapter 6.2. The TCP protocol of the Internet is based on window control. That is, the 'transit window' is known; the concept of a 'credit window' for the payment, in the present example in regard of streaming content of (parts of) digital works is novel.

The Transmission Control Protocol (TCP) allows for segmentation of the data to be transmitted into IP packets and for numbering of the bytes. Using these numbers the receiver of a TCP connection re-orders the received packets, in case IP has delivered them out of order. It further sends an ACK packet (acknowledgment) back to the sender for each received packet of which the preceding packets have also been received. The TCP sender uses these ACKs to determine which packets need to be resent in order to repair for losses, and by that to turn the IP best-effort delivery into a reliable end-to-end transport. A packet is retransmitted after a time-out period has expired during which an expected ACK has not been received, or when its previous packet has been ACK-ed three times. The time-out period is based on an estimate of the Round Trip Time (RTT). Duplicate ACKs indicate that packets succeeding the missing one have been received, which in turn is an indication that there is no further congestion in the transport channel.

Other alternatives of informing the sender on missing packets is by sending NAKs, Negative ACKs, or SACKs, Selective ACKs.

TCP also makes use of the ACKs to determine its transmission rate. This rate follows as the number of packets en route for which acknowledgement is required, the window, relative to the RTT. The window is increased upon successful transmission, while conversely lost packets decrease it. In this way TCP adapts its transmission rate to the available bandwidth.

These and other aspects of the invention will be apparent from and elucidated with reference to the embodiment(s) described hereinafter.

Figure 1:
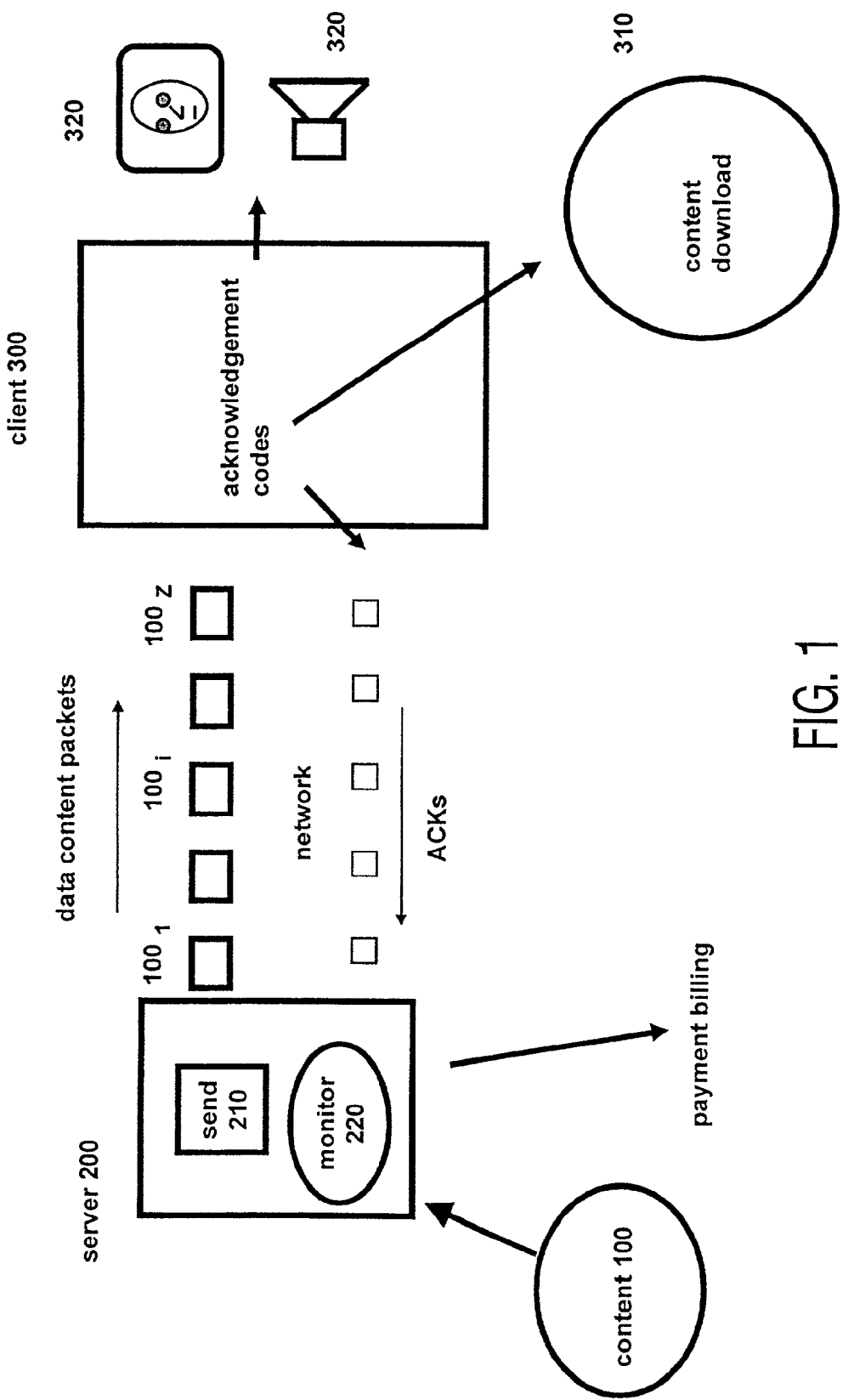
FIG. 1 depicts a general set-up of the process according to the invention.

According to an embodiment of the invention, following a request from a client to a server, e.g. during a session initiation phase, there is a negotiation phase between the two in regard of the setting-up of a return traffic of acknowledgement codes and payment tokens. Agreement is to be reached on the same and also on other technical aspects such as type of content, type coding, IP addresses, port numbers, etc. A following step in the process according to the invention entails that a digital work (100), for example with multimedia content, is formed into a number of digital packets ($100_1 \ldots 100_Z$) at a server (200). The size of a packet ($100_{1 \ldots i \ldots Z}$) is small as compared to the size of the digital work (100) concerned. For example, in the case of audio content, the size of the packets would be small enough to be able to comply with transmission at 20 ms intervals. The server (200) comprises sender software and/or hardware components (210) which it uses to transmit the packets ($100_1 \ldots 100_Z$) to a client (300). The client (300) stores (310) or reproduces (320) or otherwise processes the packets it receives. It acknowledges (330) the packets received by sending acknowledgement codes (ACKs) to the server. A monitor (220) in the server comprising receiver software and/or hardware components(not shown) receives the acknowledgement codes (ACKs) sent by the client and based on these it controls the continuation of the transmission of packets. To this end the monitor (220) issues control commands to the sender software and/or hardware (210). There is continuation of the streaming of said content by the server only if the acknowledgement code(s) requested from the client is (are) received as specified by the server, otherwise there is discontinuation of the streaming transmission by the server if the initiated successive return traffic of acknowledgment codes from the client to the server is disrupted. The received acknowledgements are also accumulated in a payment registry (not shown) that handles the further billing. Note that it is not necessary to have one ACK packet returned by the client for each and every data packet sent by the server. It will be apparent that other mappings can serve as well.

Figure 2:
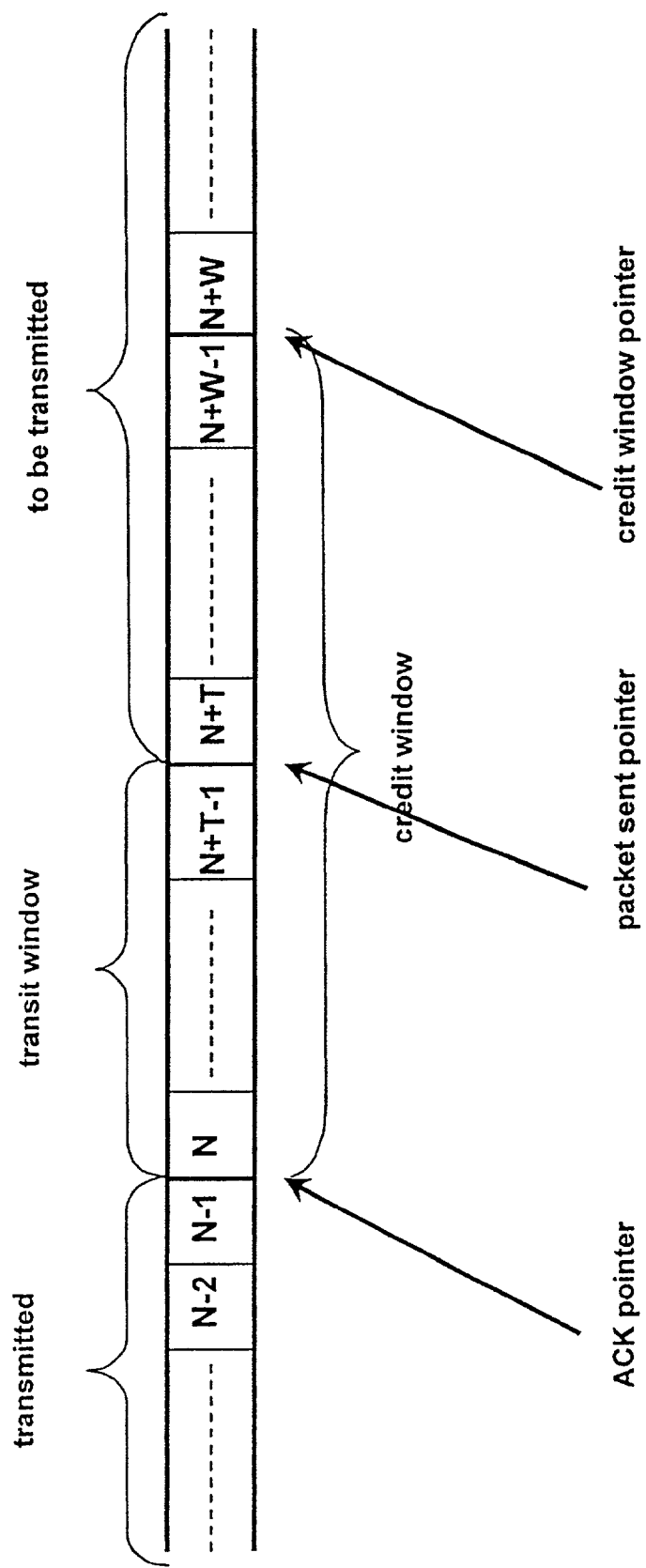
FIG. 2 depicts the operations of the monitor according to FIG. 1.

FIG. 2 provides an elaboration on the control operations of the monitor (220) according to FIG. 1. FIG. 2 depicts the order of the consecutive packets of the media stream. The packets up to the packet indexed N−1 have been transmitted. T number of packets have been transmitted, but are yet to be acknowledged by the client, i.e. these packets are in transit. The server is set to accept that at any given instant up to W number of packets may not yet be acknowledged. If W packets are not acknowledged in time, the server will discontinue the transmission.

The monitor (220) administrates the number of packets being transmitted, and the number of packets which are in transit. The packets being transmitted are labelled as either Successful or Unsuccessful, depending on whether an ACK has been received for that packet or not, respectively. Each packet is also associated with a transmission time and a retransmission deadline. The former indicates when the packet will be transmitted during normal operation; the latter indicates whether re-transmission is useful such that the client can still receive the packet in time for reproduction. (In regard of a download operation this is always the case.) These times do not necessarily increase in proportion to the number (order) of the packets. In this embodiment and only by way of example it is to be assumed that these times do increase proportionately with the packet order in question.

In one embodiment of the invention, acknowledgement of the data received can be purposively made to be time-limited. An example is the case in which listening to audio material or viewing video material is granted on pre-listening or pre-viewing conditions, respectively. Acknowledgement is restricted and the server discontinues when the time-limit set has passed. During the pre-listening or pre-viewing period, a client or user is offered the possibility of confirming the transaction and, if not confirmed as required, no further transmission is allowed.

It is conceivable that there is a different payment policy for the content received during a pre-view or pre-listen period. It is also conceivable that said content be treated differently in regard of payment policy after any re-setting of the credit window.

In another embodiment of the invention, the credit window can initially be large. It is possible to set the size of the credit window one or several times again after the pre-view or pre-listen period. An increment in the size of the credit window would relate to the number of ACKs which would not need to be received by the server during the pre-view or pre-listen or any other type of trial period. It is also possible to consider and implement a decrement in the size of the credit window if it so required or desired. Further actions on the part of a client, e.g. acknowledgement by the client before the trial period lapses, can be technically implemented in a decision tree or protocol. In yet another embodiment, the credit window mechanism can be initiated only after the trial period has lapsed. This would require synchronisation with the client side of the process and the system for implementing the same.

User confirmation can be given in several ways. For example, if there is no action taken by the client or user, the server will confirm proper receipt of the data packets when the file has been delivered. This in analogy to "no news from the client means good news (=proper receipt), therefore the transaction is in order." A second example is generation of action in regard of good delivery of the data packets at the end of recording by the client or user. Said action could be with respect to any active move related to the player device. It will be readily apparent that there could be need for discriminating between all sorts clicks or other actions taken by the user, for otherwise no simultaneous actions could be undertaken during delivery of the data packets. A third example would entail the facility of a button denoted e.g. "received properly" on a user screen and/or a remote control facility. All sorts of user interfaces could be applied in this regard.

Figure 3:
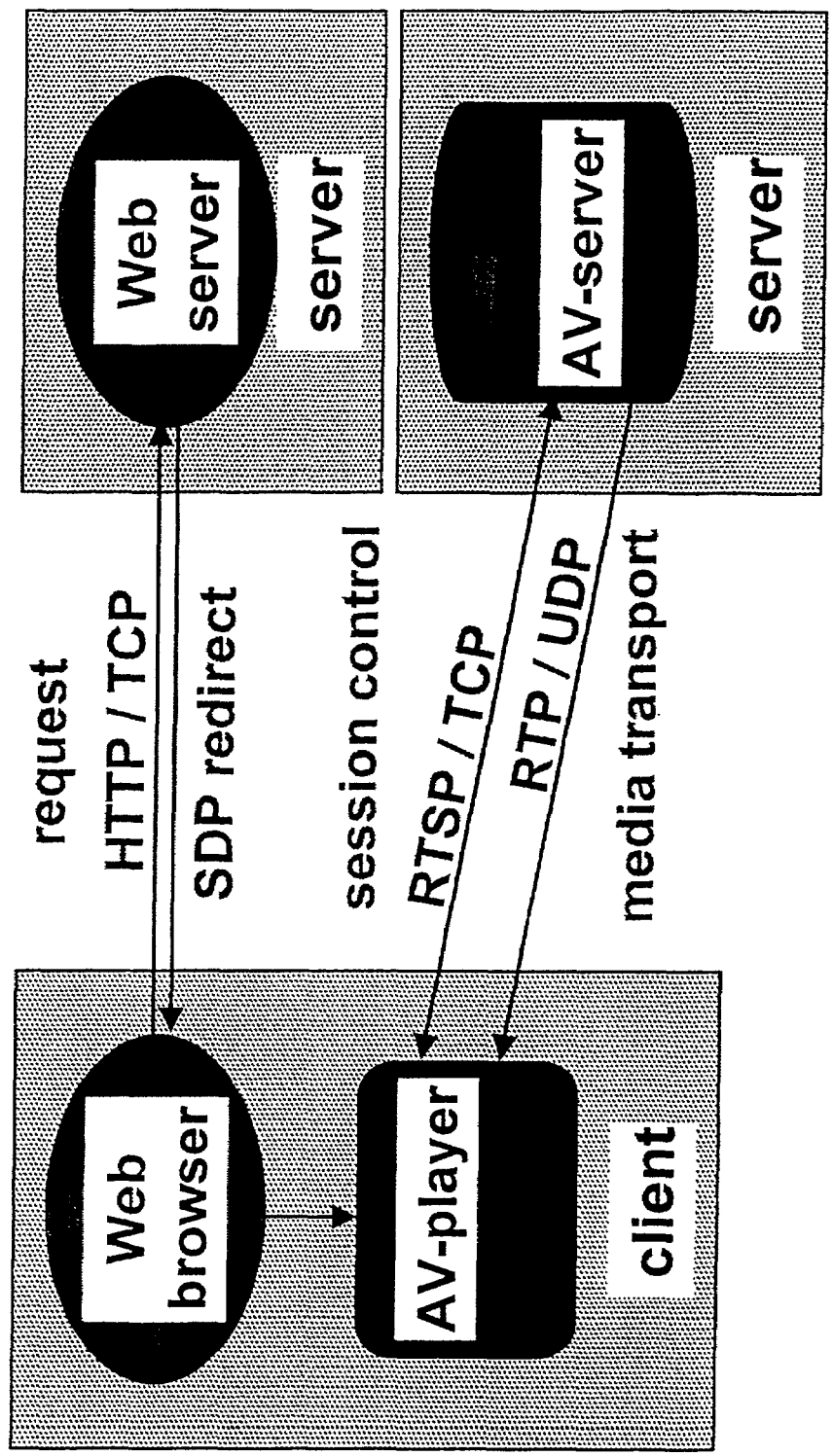
FIG. 3 depicts the role of protocols in traffic between the server and the client.

FIG. 3 depicts the role of various examples of protocols in the traffic between the server and the client. It shows some examples of protocols usable for the different exchange phases in the traffic between the server and the client. During the session initiation and negotiation phases, HTTP/TCP protocols can be used; negotiation and initiation/configuration can be exchanged using SDP; during session control and media content transport RTSP/TCP and RTP/UDP protocols can be used.

With reference to the state of operation shown in FIG. 2, the monitor (220) updates the various pointers to the various window boundaries shown in FIG. 2 according to the following algorithms (these algorithms are only by way of example):

Upon reception of $ACK_N$:
increment ACK pointer by one to position N
increment credit window pointer by one to position N+W
mark location N as Successful
Upon reception of an $ACK_{N+P}$, P>0:
increment credit window pointer by one to position N+W
mark location N+P as Successful
for p=0 to P−1 do:
  if retransmission deadline of packet N+p has passed:
    increment ACK pointer to position N+p (as said, in this example a monotonous increase in retransmission deadlines is assumed)
    mark location N+p as Unsuccessful
  otherwise (retransmission deadline of packet N+p has not yet passed):
    retransmit packet N+p (retransmission may also be initiated by other mechanisms like a time-out; similarly, a retransmission may require reception of more than one $ACK_{N+P}$, P>0)

Upon reception of an $ACK_{N−M}$, M>0:
  if location N−M was marked Unsuccessful:
    mark location N−M as Successful
    increment credit window pointer by one to position N+W Packets are transmitted at a regular pace, i.e. the packet sent pointer is incremented by one, opening the transit window, at a regular pace. A packet is transmitted if it is in both the transit and credit window. In normal operation, as exemplified in FIG. 2, it means that the packet N+T is sent when its transmission time passes. Otherwise, in case its transmission time has passed, but not its transmission deadline, the packet is sent when the credit window opens to include that packet. In principle, if the transmission deadline has passed, the packet is marked Unsuccesful. In such a situation, the whole transmission is deemd to have been disrupted.

In regard of the size of the credit window W: the number of open ACK codes, i.e. for the data packets sent receipt of which have not yet been acknowledged by the client, can be set to be incremented if a certain number of (additional) ACKs have been received or if the data packets have been sent and received for a certain period of time. Conversely, the credit window can be decremented if the transmission is not occurring smoothly.

Payment is according to the number of Successful counts. The choice of T is such that retransmissions of lost packets can be done within the given deadline. The choice of W is dependent on the credit that the transaction is willing to accept. W should be small, i.e. insignificant, compared to the total number of transmitted packets.

Suppression of ACKs by the client will close the credit window W. Eventually, the transmission will be discontinued. In an error-prone transmission channel, ACKs will not be received, either because the packet was not received, or because its ACK was lost. This will prohibit the credit window to open. If in addition the retransmission deadlines are too critical, the transmission may be discontinued, even though the client is acknowledging all packets it does receive.

Losses are undesirable because of the associated distortion the client will experience in the reception. Window closing due to sustained losses can be circumvented by a well-dimensioned choice of W, compared to T. Sustained loss rates can be circumvented in the negotiation phase during establishment of the connection. Say, for example, that the client and server agree on an acceptable loss rate of e %. Aside from possible transmission of additional redundancy packets, it implies that the credit window pointer is incremented by one after every hundred/e (the reciprocal of e %) packets being marked Unsuccesful (corrected for packets being re-marked to Succesful).

Maskerading by a client can be prevented by having the server send so-called "challenges" along with the data packets to the client and by having the client to return responses to the same along with the return traffic of acknowledgement codes.

The invention also extends to computer programmes, in particular to computer programmes on or in a carrier, adapted for putting the invention into practice. The programme may be in the form of source code, object code, a code intermediate source and object code such as in partially compiled form, or in any other form suitable for use in the implementation of the processes according to the invention. The carrier may be any entity or device capable of carrying the programme.

For example, the carrier may comprise a storage medium, such as a ROM, e.g. a CD ROM or a semiconductor ROM, or a magnetic recording medium, e.g. a floppy disk or a hard disk. Also, the carrier may be a transmissible carrier such as an electrical or optical signal which may be conveyed via electrical or optical cable or by radio or by other means.

When the programme is embodied in a signal which may be conveyed directly by a cable or other device or means, the carrier may be constituted by such cable or other device means.

Alternatively, the carrier may be an integrated circuit in which the programme is embedded, the integrated circuit being adapted for performing, or for use in the programme, of the relevant process steps.

The process, constituent protocol thereof and system and computer programme for implementation of the same as described above are generally applicable in cases in which micropayments come into play. Some suitable and in no way delimiting examples relate to devices with downloading or streaming capabilities which are connected to communications channels such as the internet, e.g. a juke box. The general novel and inventive concept described above can also be made suitable for use with television and set-top boxes.

The invention claimed is:

1. Process for controlling delivery of digital works across a communication channel wherein there is to be paid for the content of said digital works, wherein the process is executable on a server computer and a client computer, said process comprising the steps of:
   a) configuring for delivery of the content of a digital work between the server and the client, via a regular flow of packets;
   b) creating at the server and executing the regular flow of packets, wherein the packet size is less than the total size of said digital work, of said content from the server to the client using a transmission or transport protocol, wherein the client is requested to acknowledge the received packets;
   c) initiation of a return traffic of acknowledgement codes (ACKs) by the client to the server wherein a payment token is associated with each acknowledgement code or with a number of acknowledgement codes;
   d) validation by the server that each acknowledgement code requested of the client is received by the server;
   e) continuation of the regular flow of packets of said content by the server only if the acknowledgement codes requested of the client are received as specified by the server;
   f) accumulation of the payment tokens received from the client in a pay-for-each-packet-received-as-acknowledged-by-the-client mode of operation; and
   g) arrangement of billing of and payment by the client for all received packets on the basis of at least said accumulated payment tokens.

2. Process for controlling delivery of digital works across a communications channel according to claim 1, wherein in step (c) or step (e) acknowledgement by the client is associated with at least one packet of the forwarding flow from the server to the client.

3. Process for controlling delivery of digital works across a communications channel according to claim 1, wherein in step (e) continuation of the flow of packets with content by the server occurs wherein a certain number of packets may be transmitted while a number of acknowledgement codes in transit less than or equal to another pre-determined number of acknowledgement codes encompassed in the credit window have not yet been received by the server.

4. Process for controlling delivery of digital works across a communications channel according to claim 3, wherein the size of said credit window is adaptable to the number of acknowledgement codes received from the client.

5. Process according to claim 1 for use in conducting business operations or commercial transactions, comprising regulation of payment based on received return traffic.

6. Process according to claim 5 for use in conducting business operations or commercial transactions, wherein in addition billing is dependent on the transmission rate and/or on the length of the transmission session and/or on the loss rate of the transmitted digital packets.

7. A method of sending and/or receiving packets by a system comprising a server and a client, said method comprising one or more steps including at least step (c) of a process according to claim 1.

8. A method of sending and/or receiving packets by a server, comprising one or more steps including at least step (c) or step (e) of a process according to claim 1.

9. A method of sending and/or receiving packets by a client, comprising one or more steps including at least step (c) or step (e) of a process according to claim 1.

* * * * *